United States Patent [19]
Tonisson

[11] Patent Number: 5,903,641
[45] Date of Patent: May 11, 1999

[54] AUTOMATIC DYNAMIC CHANGING OF AGENTS' CALL-HANDLING ASSIGNMENTS

[75] Inventor: Alan V. Tonisson, Beecroft, Australia

[73] Assignee: Lucent Technologies Inc., Murray Hill, N.J.

[21] Appl. No.: 08/790,010

[22] Filed: Jan. 28, 1997

[51] Int. Cl.⁶ .................................................. H04Q 3/64
[52] U.S. Cl. ........................ 379/266; 379/265; 379/309
[58] Field of Search .................................. 379/265, 266, 379/309, 210, 211, 212; 370/270

[56] References Cited

U.S. PATENT DOCUMENTS

| | | | |
|---|---|---|---|
| 4,885,686 | 12/1989 | Vanderbei | 364/402 |
| 5,031,089 | 7/1991 | Liu et al. | 364/200 |
| 5,148,365 | 9/1992 | Dembo | 364/402 |
| 5,185,715 | 2/1993 | Zikan et al. | 364/807 |
| 5,185,780 | 2/1993 | Leggett | 379/266 |
| 5,206,903 | 4/1993 | Kohler et al. | 379/309 |
| 5,299,260 | 3/1994 | Shaio | 379/266 |
| 5,309,513 | 5/1994 | Rose | 379/265 |
| 5,335,269 | 8/1994 | Steinlicht | 379/266 |
| 5,467,391 | 11/1995 | Donaghue, Jr. et al. | 379/265 |
| 5,499,291 | 3/1996 | Kepley | 379/265 |
| 5,506,898 | 4/1996 | Costantini et al. | 379/266 |
| 5,594,791 | 1/1997 | Szlam et al. | 379/265 |
| 5,721,770 | 2/1998 | Kohler | 379/309 |

FOREIGN PATENT DOCUMENTS

| | | | |
|---|---|---|---|
| 0740450 | 10/1996 | European Pat. Off. | H04M 3/50 |
| 2293724 | 4/1996 | United Kingdom | H04M 3/50 |
| WO96/22650 | 7/1996 | WIPO | H04M 3/50 |

OTHER PUBLICATIONS

D. Harvey, S. Hogan, J. Payseur, *Call Center Solutions*, AT&T Technical Journal, 70(1991) Sep./Oct. No. 5, Short Hills, NJ, (US), pp.36–44.

K. Hassler, C. Jones, J. Kohler, R. Nalbone, *Revolutionizing DEFINITY*[R] *Call Center in the 1990s*, AT&T Technical Journal, 74(1995) Jul./Aug., No. 4, New York, (US) pp. 64–73.

*IEX*, Computer Telephony, vol. 5, Issue 8, Aug. 1996, p. 138.

*Primary Examiner*—Scott Wolinsky
*Attorney, Agent, or Firm*—David Volejnicek

[57] ABSTRACT

An agent vector monitors selected performance parameters of a call center, such as service times, in-queue times, call volumes, call abandonment rates, benefits derived from having different agents handle calls requiring different skills, proportions of work spent by agents on handling calls requiring different skills, etc., and automatically adjusts agents' call-handling assignments, for example, by changing the skills to which an agent is assigned or by changing the relative priorities of the agent's skills, in order to optimize a predefined objective. The objective is a selected performance characteristic of the call center, for example, the total benefit to the call center of individual ones of the agents handling calls requiring individual agent skills.

25 Claims, 3 Drawing Sheets

AUTOMATIC DYNAMIC CHANGING OF AGENTS' CALL-HANDLING ASSIGNMENTS

TECHNICAL FIELD

This invention relates to automatic call distribution (ACD) systems, also variously referred to as call centers or telemarketing systems.

BACKGROUND OF THE INVENTION

ACD systems distribute calls incoming to a call center for handling to any suitable ones of available call-handling agents according to some predefined criteria. In advanced modern-day ACD systems, suitability of an agent to handle a call is determined by matching skills that are needed to handle a particular call against the skills possessed by the agents who are available to handle that call. An illustrative such system is disclosed in U.S. Pat. No. 5,206,903.

It often happens that the call center becomes overloaded by calls, so that no suitable agents are available to handle the calls at the moment that the calls come in. The calls then back up, and are placed in call queues based upon some predefined criteria, such as the skills that are needed to handle them. There they await suitable agents becoming free and available to handle them. When the ACD system detects that an agent has become available to handle a call, the ACD system delivers to the agent the highest-priority oldest-waiting call that matches the agent's highest skill. Generally the only condition that results in a call not being delivered to an available agent is that there are no calls waiting to be handled that require any of the available agent's skills. The available agents are then placed in agent queues based upon some predefined criteria, such as the skills which they possess. There they await the arrival of suitable calls for handling. When a call arrives, the ACD system delivers the call to the longest-waiting agent whose skills best match the call's requirements. Call center efficiency typically requires that both calls and agents spend as little time in queues as possible.

As call volumes of calls requiring different skills change, agents may need to be reassigned to different skills (i.e., to handling calls requiring different ones of the skills possessed by the agents) to balance the call load. The task of monitoring service levels, determining which skills each agent should be logged into at any given time, and moving the agents between skills to maintain optimal staffing is complex, time-consuming, laborious, and slow. This function is normally carried out manually by the call center supervisor. Consequently, the supervisor must almost constantly monitor the performance of the call center and adjust agent assignments as call volumes change. Even then, the supervisor's reactions to changes in the call center's workload are often either delayed if properly computed or inaccurate if done reflexively, based only on experience and without computation, to avoid delay. Moreover, the call center supervisors are normally the most experienced employees and the call center's most valuable resource, whose time could be better spent on other call center work.

SUMMARY OF THE INVENTION

This invention is directed to solving these and other problems and disadvantages of the prior art. Generally according to the invention, there is provided an arrangement that monitors a call center's performance parameters—such as service times, in-queue times, call volumes, call abandonment rates, benefits derived from having different agents handle calls requiring different skills, proportions of work (e.g., time or calls handled) spent by agents on handling calls requiring different skills, etc.—and automatically adjusts agents' call-handling assignments—for example, by changing the skills to which an agent is assigned (logged into) or by changing the relative priorities (levels of expertise) of the agent's skills—in order to optimize a predefined objective or objectives. The objective is a selected performance characteristic of the call center, such as the total benefit to the call center of individual ones of the agents handling calls requiring individual agent skills. The term "automatically" is used herein to mean by means of a machine (e.g., an ACD or some other processing system or computer), as opposed to manually by the call-center supervisor or some other person.

Specifically according to the invention, call center agents are automatically assigned to skills in a call center wherein individual calls requiring different skills are handled by a plurality of agents who are individually assigned to different ones of the skills, in the following manner. The present values of call center parameters that impact a predetermined performance characteristic of the call center are automatically determined. The characteristic is one which is sought to be optimized—for example, the total benefit to the call center of individual ones of the agents handling calls requiring individual ones of the skills. The parameters include actual assignments of the plurality of call center agents to skills. The parameter of actual assignments of the plurality of call center agents to skills preferably is the parameter of actual proportions of work that individual ones of the agents spend handling calls requiring individual ones of the skills. Then an optimization function that uses the determined parameter values is automatically performed on the predetermined performance characteristic to determine optimum assignments of the plurality of call center agents to skills that optimize the predetermined performance characteristic. The optimum assignments of the plurality of call center agents to skills preferably are optimum proportions of work for individual ones of the agents to spend handling calls requiring the individual ones of the skills. The actual assignments of the plurality of call center to skills are then automatically adjusted to bring the actual assignments closer to the determined optimum assignments. Preferably, the adjusting involves assigning an individual agent to handle calls requiring an individual skill, in response to the optimum proportion of work for the individual agent to spend handling calls requiring the individual skill exceeding the actual proportion of work that the individual agent spent handling calls requiring the individual skill and the individual agent not being assigned to handle calls requiring the individual skill, and further preferably involves freeing ("un-assigning") the individual agent from handling calls requiring the individual skill, in response to the actual proportion of work that the individual agent spent handling calls requiring the individual skill exceeding the optimum proportion of work for the individual agent to spend handling calls requiring the individual skill and the individual agent being assigned to handle calls requiring the individual skill.

The invention advantageously frees call center supervisors from having to decide which agents to assign to which skills as call volumes change. It provides more efficient allocation of call center resources (agents) than could be reasonably achieved by manual means. It allows the call center supervisor to manage a call center simply by deciding which performance characteristic should be optimized. The operation of the call center is then automatically adjusted to optimize the selected performance characteristic. It automates many aspects of running the call center, thereby freeing the call center supervisor to do other things, while still retaining a high degree of control for the supervisor. And it reduces the need to write complicated call vectors or individual per-agent agent vectors to control the distribution of calls.

Furthermore, the invention is very flexible and can be used to control many aspects of a call center. For example, it can be used to extract information from the optimization function for use by features like "wizards" which advise a supervisor on the best course of action to take, e.g., "Add 3 more agents skilled in Sales". This can form the basis of an expert system for call center applications. The optimization function can also be used in conjunction with predicted call volumes to allow optimum agent allocations to be calculated ahead of time and to advise a call center supervisor on when to add agents with particular skills. This facility can be used to assist in scheduling of agents.

These and other advantages and features of the invention will become more apparent from the following description of an illustrative embodiment of the invention taken together with the drawing.

DETAILED DESCRIPTION

1. Call Center General Description

Figure 1:
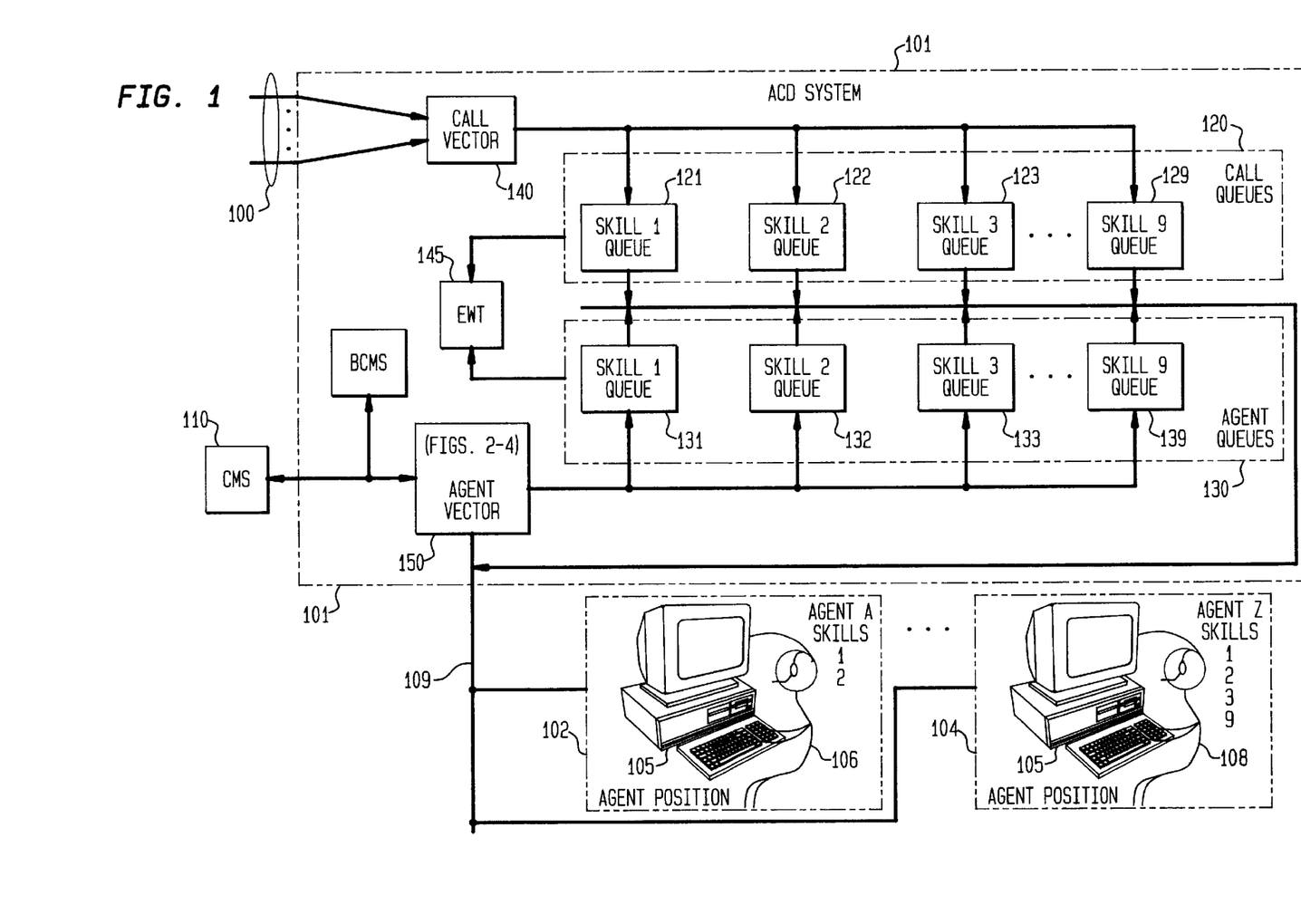
FIG. 1 is a block diagram of a call center that includes an illustrative embodiment of the invention.

FIG. 1 shows an illustrative call center. As is conventional, the call center comprises a plurality of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. Terminals 105 are connected to ACD system 101 by a voice-and-data transmission medium 109. Also, included in ACD system 101 is a conventional basic call management system (BCMS) and connected to ACD system 101 is a conventional call management system (CMS) that gather call records and call-center statistics for use in managing the call center and in generating call-center reports. CMS and BCMS will hereafter be referred to jointly as CMS 110.

ACD system 101 is illustratively the Lucent Technologies Definity® private-branch exchange (PBX)-based ACD system. It is a stored-program-controlled system that conventionally includes interfaces to external communications links, a communications switching fabric, service circuits (e.g., tone generators, announcement circuits, etc.), memory for storing control programs and data, and a processor for executing the stored control programs to control the interfaces and the fabric and to provide automatic call-distribution functionality. Included among the data stored in a memory of ACD system 101 are a set of call queues 120 and a set of agent queues 130. Each call queue 121–129 corresponds to a different agent skill, as does each agent queue 131–139. Conventionally, calls are prioritized, and either are enqueued in individual ones of call queues 120 in their order of priority or are enqueued in different ones of a plurality of call queues that correspond to a skill and each one of which corresponds to a different priority. To simplify the illustrative example of the invention, system 101 is configured to assign each call to only one call queue which corresponds to the skill that the call needs the most. Likewise, each agent's skills are typically prioritized according to his or her level of expertise in that skill, and either agents are enqueued in individual ones of agent queues 130 in their order of expertise or are enqueued in different ones of a plurality of agent queues that correspond to a skill and each one of which corresponds to a different level of expertise. Included among the control programs in a memory (e.g., RAM, ROM, disk, or some other storage device) of ACD system 101 are a call vector 140, an agent vector 150, and a function for estimating in-queue waiting time (EWT) 145. Calls incoming to the call center on lines or trunks 100 are assigned by call vector 140 to different call queues 121–129 based upon the agent skill that they require for their proper handling. EWT 145 computes estimates of how long an incoming call will have to wait in a call queue 121–129, e.g., before being handled by an agent. Agents 106–108 who are available for handling calls are assigned by agent vector 150 to agent queues 131–139 based upon the skills which they possess. Individual calls requiring different skills are handled by agents 106–108 who are individually assigned to different ones of the skills. Call vectoring is described in DEFINITY® Communications System Generic 3 Call Vectoring/Expert Agent Selection (EAS) Guide, AT&T publication no. 555-230-520 (Issue Nov. 3, 1993). Skills-based ACD is described in further detail in U.S. Pat. No. 5,206,903. An illustrative EWT function is described in U.S. Pat. No. 5,506,898. An illustrative implementation of agent vectoring is described in U.S. patent application Ser. No. 08/674,477, filed on Jul. 2, 1996, issued as U.S. Pat. No. 5,721,770, on Feb. 24, 1998 and incorporated herein by reference.

According to the invention, agent vector 150 is configured as follows.

As each agent 106–108 logs in at an agent position 102–104, agent vector 150 automatically assigns the agent to handling calls that require one or more of the skills of that agent, by logging the agent into the one or more of the skills. As the call volumes of calls requiring different skills (i.e., call volumes of calls in different call queues 121–129) change, the assignment is periodically recalculated and changed by agent vector 150 as required.

The assignment of an agent to skills is proportional. E.g., an agent may be 30% allocated to one skill and 70% allocated to another skill. This means that, on average, 30% of the agent's work time should require the first skill and the remaining 70% of the agent's work time should require the second skill. An agent will not be logged into a skill if that agent's optimum proportion of calls requiring that skill is determined to be either zero or below some predetermined threshold.

There are two components to a complete solution: 1) An optimization function which calculates the optimum proportions. The optimum proportions are calculated as the solution of a constrained linear optimization problem. This is a well-understood problem, and there are many algorithms for solving this problem. 2) A call-distribution or an agent-vectoring algorithm which distributes calls to agents in the optimum proportions.

The inputs to the linear optimization include a set of levels of priority, or expertise, in each skill for each agent. These numbers represent the "value" to the call center of the agent taking a call that requires that particular skill. The size of the values is not important, but the relative size of the values determines the relative benefit to the call center of the agent taking a call in the skill. E.g., if agent A has a value of 30 in a skill and agent B has a value of 90 in the same skill, then it is three times more desirable for agent B to take a call in that skill than for agent A to take the call.

Optimum operation of the call center may involve minimizing the operating cost of the call center or maximizing the level of service, or it may be defined in terms of other relevant performance characteristics of the call center. The optimization objective determines the values used as inputs to the optimization and some of the parameters of the optimization. The objective may be different for different call centers.

Once the optimum proportions for allocation of agents to skills have been calculated, calls must be distributed to agents so that the call loads match the desired proportions. This can be achieved by storing the percentage of time spent by each agent handling calls in each skill in the last X minutes (or whatever other period of time makes sense) and distributing calls to agents in such a way as to bring the percentages closer to the ideal.

The computations performed by agent vector 150 are based on the following model of the call center of FIG. 1.

2. Modeling a Call Center 2.1 Elements of the Model

The model assumes that a call center has a number of queues, and that each queue is associated with exactly one skill. When calls arrive at a call center, they are placed in queues. Each call is queued in exactly one queue at any given time. This makes sense because the solution presented here removes any need to queue a call to more than one skill at any time.

As agents become available, if there is a call available in one of the call queues corresponding to a skill that the agent is logged into, the first call is taken from one of the call queues and is passed to the agent. It is assumed that the ACD is capable of distributing calls in such a way that a fixed proportion of the agent's workload—either time or number of calls handled—can be allocated to each skill.

The model is restricted to only consider the life of calls coming from queues and serviced by agents. It is only concerned with the average volume of calls coming into the call center to each skill. Measures of performance such as an estimate of the time that a caller should expect to wait in a queue before the call is answered by an agent (EWT) and the length of time that the oldest call in a queue has been waiting (OCW) are related to the rate at which calls enter the call center and the rate at which calls are being serviced, and are not considered in the model.

To model the distribution of calls to agents, individual calls are ignored. It is assumed that calls are like water flowing through pipes and that it is desired to maximize the "value" of the flow of calls through a call center. The behavior of queues is ignored, as queues serve mainly to smooth out fluctuations in the call volume entering a call center.

The main elements of the model are skills, agents, call volumes, and measures of value.

2.2 Measuring Call Volumes

If a call center has n skills numbered 1 to n, and m available agents numbered 1 to m, we define the following notation:

Let $V_s$ be the volume of calls arriving in skill s, for s=1, ..., n. These volumes are measured by counting the number of calls arriving in each skill in the last x minutes—whatever time period makes sense for the call center.

Let $A_s$ be the volume of abandoned calls in skill s.

Let $V_{s,a}$ be the volume of calls from skill s being handled by agent a, where s=1, ..., n and a=1, ..., m.

We also need to take into account the capacity of each agent to handle calls in each skill.

Let $C_{s,a}$ be the capacity of agent a to handle calls in skill s, for s=1, ..., n and a=1, ..., m. I.e., $C_{s,a}$ is the (maximum, average) volume of calls that agent a can handle in skill s. These values are measurable positive call volumes. These capacities are measured from historical data by taking the number of calls handled by each agent in each skill over a sufficiently long period and dividing them by the total time that the agent has spent handling those calls in each skill—including after-call work (ACW) time, etc. It may make sense to ignore differences between individual agents and use an average of all agents handling calls in each skill.

Let $R_{s,a}$ be the proportion of time that agent a spends handling calls from skill s, for s=1, ..., n and a=1, ..., m.

The values Vs, $V_{s,a}$ and $C_{s,a}$ have units of calls per hour. The $R_{s,a}$ values are dimensionless.

Note that $V_{s,a}=C_{s,a} \times R_{s,a}$, for s=1, ..., n and a=1, ..., m.

By varying the proportion of time that each agent spends handling calls in each skill, the running of the call center can be optimized to maximize a given objective.

2.3 Constraints

These quantities defined so far satisfy the following relationships:

$$V_s = \sum_{a=1}^{m} V_{s,a} + A_s, \text{ for } s = 1, \ldots, n.$$

I.e., the volume of calls coming into a skill equals the sum of the total volume of calls handled by agents for that skill plus the volume of calls abandoned. This constraint can be rewritten in terms of the proportions $R_{s,a}$ as follows:

$$\sum_{a=1}^{m} C_{s,a} \times R_{s,a} = V_s - A_s, \text{ where } s = 1, \ldots, n.$$
$$R_{s,a} \geq 0, \text{ where } s = 1, \ldots, n \text{ and } a = 1, \ldots, m.$$

I.e., an agent cannot spend a negative proportion of his or her time on calls from any skill.

$$\sum_{s=1}^{n} R_{s,a} \leq 1, \text{ where } a = 1, \ldots, m.$$

I.e., the relative proportions of time that an agent spends handling calls in each skill cannot add up to more than one.

2.4 Measuring Call Center Performance

To optimize the operation of a call center, we need to assign an estimate of value to each call handled. How the value of each call is determined will be different for each call center.

The values of calls handled are, in general, different for different skills and also depend on which agent handles the call. E.g., it is of more value for an agent who is well-trained in a skill to handle calls for that skill, than one who has little or no training for the skill. To model this, we define a value for each agent taking calls in a particular skill:

Let $B_{s,a}$ be the benefit or value to the call center of a call from skill s being handled by agent a, for s=1, ..., n and a=1, ..., m.

$B_{s,a}$ is a per-call benefit and does not take into account how long it takes for the agent to handle the call. $B_{s,a}$ may be thought of as the expertise that agent a has in skill s. Note that only the relative sizes of these values are important for the purpose of optimizing the call center.

How the $B_{s,a}$ values are chosen depends on the call center's purpose. They may represent (average) dollars of profit per call, or a negative value representing the cost of a call, etc. These quantities can be measured or estimated.

A better measure of an agent's performance also takes into account the volume of calls that the agent can handle in each skill:

Let $L_{s,a} = C_{s,a} \times B_{s,a}$, for $s=1, \ldots, n$ and $a=1, \ldots, m$.

$L_{s,a}$ is a measure of the benefit to the call center of agent a taking calls in skill s per unit time. E.g., if $L_{2,5}=25$ and $L_{3,1}=50$, then it is twice as valuable for agent 1 to spend an hour taking calls in skill 3 as it is for agent 5 to spend an hour taking calls in skill 2. $L_{s,a}$ is a measure of the expertise of the agent in the particular skill.

Since $C_{s,a}$ is a measurable quantity, defining $L_{s,a}$ for each agent/skill pair is equivalent to defining $B_{s,a}$ for each agent/skill pair. Either of these sets of values may be used to define the objective function for a call center. The $L_{s,a}$ values may also be chosen to be values that can be measured, such as profit in dollars per hour.

It is also convenient to define a penalty for abandoned calls:

Let $P_s$ be the penalty for an abandoned call in skill s, for $s=1, \ldots, n$.

The overall efficiency of the call center can be measured by the quantity:

$$B = \sum_{s=1}^{n} \sum_{a=1}^{m} B_{s,a} V_{s,a} - \sum_{s=1}^{n} P_s A_s$$

$$= \sum_{s=1}^{n} \sum_{a=1}^{m} L_{s,a} R_{s,a} - \sum_{s=1}^{n} P_s A_s$$

where B represents the total benefit to the call center of individual ones of the agents handling calls requiring individual ones of the skills.

2.5 Other Performance Measures

Customers typically use a variety of metrics to measure call-center performance. These include oldest-call waiting (OCW), average speed of answer (ASA), and service level. This model does not take into account these measures because they can all be viewed as indicators of the percentage of utilization of the resources available for handling calls in the given skill. E.g., if the EWT for sales is too high, then this indicates that there are insufficient resources allocated to sales, i.e., the estimate of call volume for sales needs to be increased.

This model does not directly take into account other measures of performance such as oldest call waiting (OCW) times, service levels, or queue lengths. These measures are all related to the ratio of the volume of calls coming into a skill and the capacity of the call center to handle calls in each skill. Queuing theory gives some relationships between these other measures of performance and volumes of calls.

2.6 Some Ideas from Queuing Theory

Queuing theory is a complex subject, and the model presented here deliberately ignores the details of what is happening in queues, but it is useful to note some elementary properties of queues to see how the model can be used to control the behavior of call center queues. For queuing theory principles relevant hereto, see, e.g., see W. Stallings, *Data and Computer Communications* (3d ed.) Macmillan Pub. Co (1988), Appendix A.

Queuing theory states that the average waiting time in a first-in, first-out (FIFO) queue is approximately proportional to $$\frac{b}{m} \frac{s}{1-p},$$

and the average number of calls in a queue is proportional to $$b \frac{p}{1-p},$$

where m is the number of agents, p is the average fraction of time that each agent is busy, and b is the probability that all agents are busy. These values are approximate because they assume that all agents are only handling one skill. There are two important things to note here:

1. As the utilization approaches 100%, the average queue length and average waiting time approach infinity. (Assuming, of course, that no calls are abandoned and that there are infinitely many trunks and infinite queuing capacity.)
2. Full utilization of call center resources is not possible without very long queue lengths and very patient customers. (About 80–90% should be realistically achievable. As the utilization reaches 80–90%, the queue lengths and waiting times start to climb very rapidly. The exact point at which this happens depends on the details of the probability distribution of the mean time between agents becoming available, which varies between call centers and skills.)

This confirms what every call center supervisor already knows: that the average waiting time and the number of calls in a queue are sensitive indicators of the utilization of the resources presently allocated to a skill.

3. Optimizing Call Center Performance

Given the above, optimization of call center performance reduces to the following optimization problem:

$$\text{maximize } B = \sum_{s=1}^{n} \sum_{a=1}^{m} L_{s,a} R_{s,a} - \sum_{s=1}^{n} P_s A_s \text{ subject to:}$$

$$\sum_{a=1}^{m} C_{s,a} R_{s,a} = V_s - A_s, \text{ for } s = 1, \ldots, n.$$

$$R_{s,a} \geq 0, \text{ for } s = 1, \ldots, n \text{ and } a = 1, \ldots, m.$$

$$\sum_{s=1}^{n} R_{s,a} \leq 1, \text{ for } a = 1, \ldots, m.$$

This problem has an exact solution which can be calculated using the well-known Simplex Algorithm (See, e.g., R. Sedgewick, *Algorithms*, Addison Wesley (1946), Chapter 38).

The values $V_s$ represent the call volumes entering the call center in each skill.

The values $C_{s,a}$ are measurable values which represent the volume of calls that each agent can handle in each skill.

The values $L_{s,a}$ and $P_s$ are determined by the call center supervisor. These values depend on the criteria chosen to measure the performance of the call center. If the $L_{s,a}$ and $P_s$ values are chosen sensibly, the allocation of calls to agents can be done automatically. These values can even be tied to quantities that can be automatically tracked.

The values $R_{s,a}$ are the values to be optimized. In most call centers, not all agents will be expected to handle calls in all skills, so some of these values may be set at 0, which means they can be ignored and left out of the optimization process.

4. Adding More Flexibility

The main aim here is to provide a means to automatically allocate call center resources where they are needed. It is the call center supervisor's responsibility to decide the relative priorities of the different skills. To make it easier for the supervisor to control where resources are allocated, per-skill weights $W_s$ may be added to the objective function:

$$B = \sum_{s=1}^{n} \sum_{a=1}^{m} W_s L_{s,a} R_{s,a} - \sum_{s=1}^{n} P_s A_s$$

The intention is that the skill levels $L_{s,a}$ should not need to change very often, as they represent expertise (levels of ability) of the agents in each skill. The skill weightings are intended to be changed in response to changing conditions. This gives the call center supervisor a means of adjusting the automatic control and overriding the priorities determined by the skill levels. E.g., if the level of service for the skill "complaints" is unacceptable and the supervisor is prepared to sacrifice service in other skills, he or she can increase the weighting for "complaints" in order to make the system allocate more resources to "complaints".

5. Limitations of the Model

This model does not take into account all of the complexity of real call centers. E.g., it assumes that once a call is queued, it is either answered by an agent or the caller will abandon the call. It does not take into account calls answered by voice-response units.

Another thing to note is that the optimum solution produced by this model may not be unique. E.g., if there are two agents, Dana and Fox, with the same level of skill in "Insurance Enquiries" and they are not needed for any other skills, then if the volume of calls in "Insurance Enquiries" is not high, the same optimum performance can be achieved by allocating half of the calls to Dana and half of the calls to Fox or all of the calls to Dana and none of the calls to Fox. If there is a choice, the Simplex Algorithm is likely to allocate all of the calls to one of the agents and none of the calls to the other. It does not ensure that the call loads are fairly distributed to agents. Additional constraints are needed to ensure fair distribution of calls.

This model ignores the behavior of the skill queues. It collapses all of the queues' properties into two numbers per queue: volume of calls and volume of abandoned calls. This means that the model cannot be used to directly to calculate optimum skill allocations for minimizing, for example, average speed of answer (ASA) over all queues. The only information that the model has about what is happening in each queue is the call volume and the number of abandoned calls. Abandoned calls are a poor indicator of poor service, because it is better to deal with long wait times in a queue before the number of abandoned calls becomes too high.

It is useful to add some penalty terms to the optimization representing the cost of poor ASA. These terms should be non-linear and have not been included in order to keep the problem simple and easily solvable. Another way to tie ASA into the model is to make the skill weights $W_s$ dependent on the queue length.

6. The Agent Vector

Given the above-described model for optimizing call-center performance, agent vector 150 operates as follows.

Figure 2:
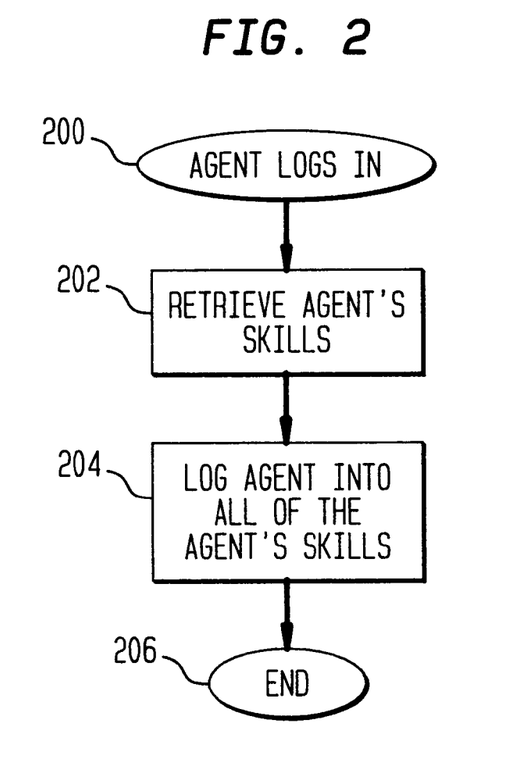
FIGS. 2–4 are flow diagrams of operations performed by an agent vector of the call center of FIG. 1 upon agent log in, agent log off, and periodically to optimize the operation of the call center of FIG. 1, respectively.
Figure 3:
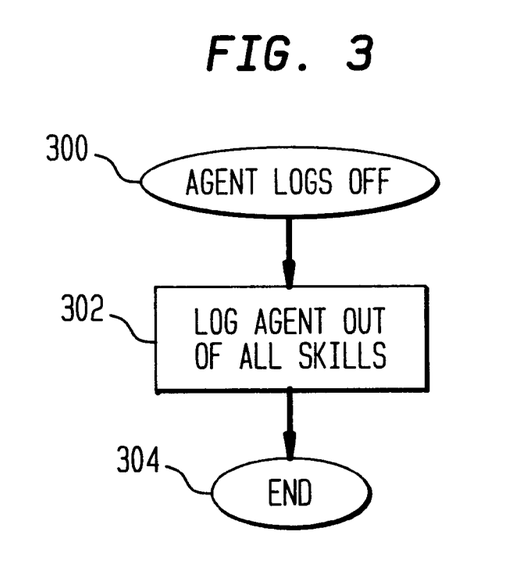

Whenever any agent 106–108 logs in at an agent position 102–104, as indicated at step 200 of FIG. 2, agent vector 150 retrieves the agent's skills and levels of expertise from a database of system 101, at step 202, and logs the agent into each of the agent's skills at the corresponding level of expertise, at step 204, and then ends, at step 206. Similarly, whenever any agent 106–108 logs off at an agent position 102–104, as indicated at step 300 of FIG. 3, agent vector 150 logs the agent out of each skill into which the agent is logged in, at step 302, and then ends, at step 304.

Periodically, agent vector 150 is invoked to perform a benefit optimization of the call center of FIG. 1. This function of agent vector 150 is diagrammed in FIG. 4. Upon its invocation, at step 400, agent vector 150 retrieves predetermined values of optimization parameters from CMS 110, at step 402. These are the values that are preestablished by the call center supervisor, such as the values for the measure of benefit to the call center of each agent taking calls in each skill per unit of time ($L_{s,a}$) and the penalty for an abandoned call in each skill ($P_s$) Agent vector 150 then uses measured data that is stored by CMS 110 to determine (measure) the present values of other optimization parameters, at step 404. These are the values for the volume of calls arriving for each skill ($V_s$), the volume of abandoned calls for each skill ($A_s$), the capacity of each agent to handle calls in each skill ($C_{s,a}$), and the actual proportion of time that each agent spends handling calls for each skill (actual $R_{s,a}$). Agent vector 150 then uses the parameter values to perform the benefit-optimization function on the predetermined call-center performance characteristic (e.g., maximize B) that was presented in Section 3 above, to obtain the optimum proportion of work that each agent spends handling calls for each skill (optimum $R_{s,a}$), for each agent and each skill, at step 406.

Figure 4:
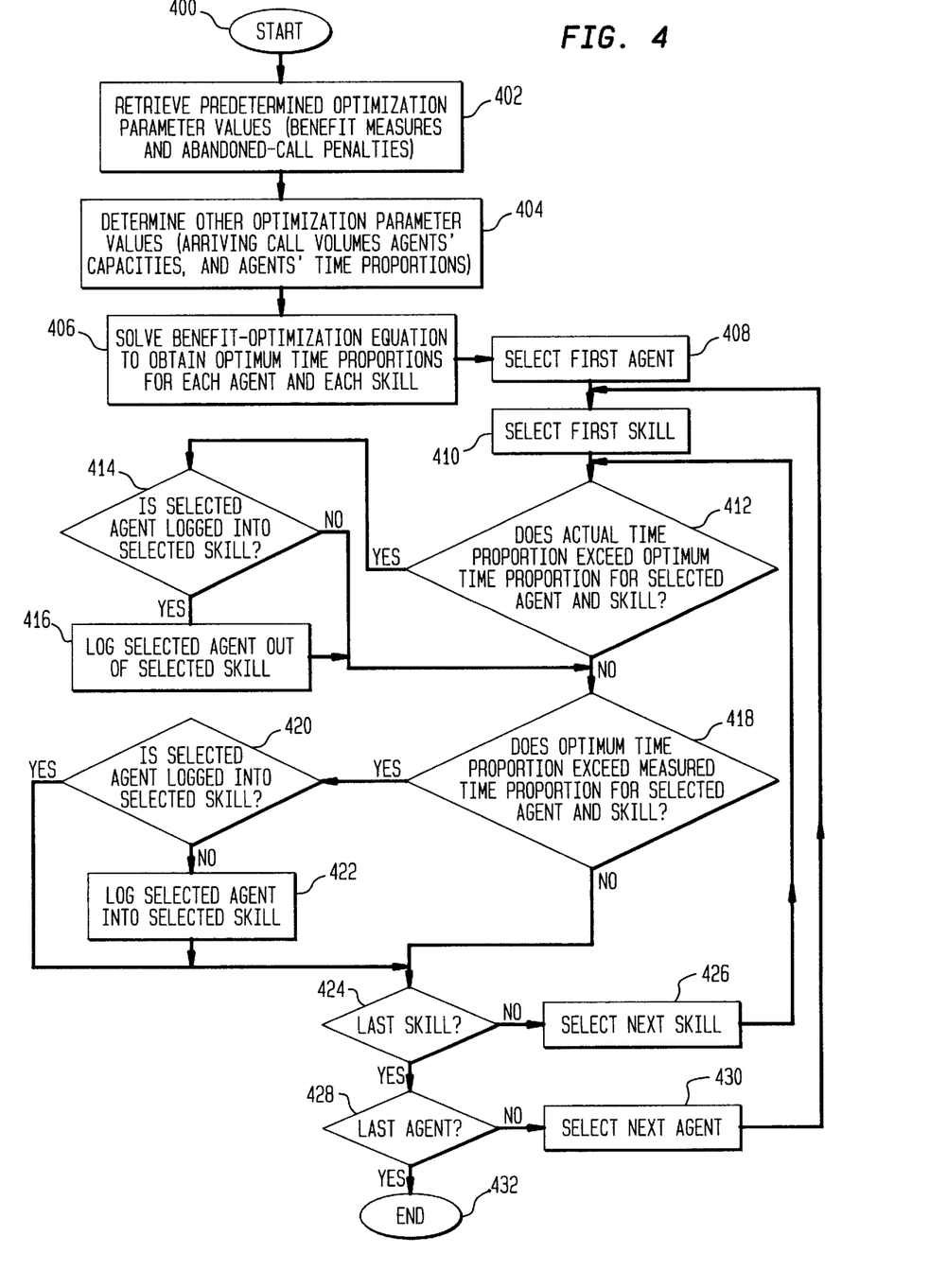

Vector 150 then compares the actual $R_{s,a}$ with the optimum $R_{s,a}$ for each agent and each skill and adjusts the agents' call-handling priorities in order to bring the actual $R_{s,a}$ values more in line with the optimum $R_{s,a}$ values. Vector 150 selects a first agent (a), at step 408, and a first skill (s), at step 410, and compares the actual $R_{s,a}$ with the optimum $R_{s,a}$ to determine if the actual proportion of work that the selected agent spends handling calls for the selected skill exceeds the optimum, at step 412. If the actual work proportion does exceed the optimum work proportion, vector 150 checks whether the selected agent is logged into the selected skill, at step 414, and if so, logs the selected agent out of the selected skill, at step 416.

Thereafter, or if it is determined at step 412 that the actual work proportion does not exceed the optimum work proportion, vector 150 determines if the optimum proportion of work that the selected agent spends handling calls for the selected skill exceeds the actual proportion of work that the selected agent spends handling calls for the selected skill, at step 418. If the optimum work proportion does exceed the actual work proportion, vector 150 checks whether the selected agent is logged into the selected skill, at step 420, and if not, logs the selected agent into the selected skill, at step 422.

Thereafter, or if it is determined at step 418 that the optimum work proportion does not exceed the actual work proportion, vector 150 checks whether it has done the optimization for each skill of the selected agent, at step 424. If optimization has not been done for each skill of the selected agent, vector 150 selects the next skill of the selected agent, at step 426, and returns to step 412 to perform the optimization for this next skill. If and when optimization has been done for each skill of the selected agent, vector 150 checks whether it has done the optimization for each logged-in agent, at step 428, If optimization has not been done for each logged-in agent, vector 150 selects the next logged in agent, at step 430, and returns to step 410 to perform the optimization for each skill of this next agent. If and when optimization has been done for all logged in agents, vector 150 ends its operation, at step 432, until it is invoked again at step 200, 300, or 400.

Of course, various changes and modifications to the illustrative embodiment described above will be apparent to those skilled in the art. For example, the optimization of call-center performance may be drastically simplified to reassign agents among skills only in response to actual or anticipated emergency service threshold being reached.

In this simplified arrangement, agents are pre-assigned to all the skills that they have been trained to handle, but only the skills in which they are scheduled to work are given high preference (expertise) levels, meaning that under normal circumstances they only handle calls from their scheduled skills. Their other, backup, skills have low preference levels, and only come into effect when there is a service level emergency.

Each skill may have one or more emergency service level thresholds administered. Exceeding these thresholds is an indication that there is a service level emergency and that the skill requires additional staffing.

Under normal conditions, (i.e., no service level emergencies), when an agent becomes available to take a call, the ACD's normal criteria for choosing a call are used. (These criteria typically include the agent's skill preference levels or work allocation, call priorities, and the time that each call has been in queue, etc.)

If the agent becomes available when one of his/her administered skills has a service level emergency, the emergency overrides all other criteria, and the agent gets a call from the skill with the emergency condition. If more than one of the agent's administered skills has a service level emergency, a number of options are available. For example, the traditional criteria, such as skill preference level, can be used to select one of the emergency skills.

At the opposite end of the spectrum, each skill may also have a low threshold administered to cater to situations where the skill has been overstaffed. In this situation, agent call handling priorities are adjusted to redirect agents away from skills with service times which are below the low threshold.

This arrangement has the ability to detect and resolve potential service problems rapidly and automatically. Enough agents are diverted to handle calls from the emergency queue, sufficient to bring the service time back within the skill's threshold, at which time call allocation returns to normal. If a predictor of future waiting times is used as the threshold criterion, potential service problems can be dealt with before any call has actually exceeded the wait time threshold.

Such changes and modifications can be made without departing from the spirit and the scope of the invention and without diminishing its attendant advantages. It is therefore intended that such changes and modifications be covered by the following claims.

The invention claimed is:

1. An arrangement for automatically assigning call center agents to skills in a call center wherein individual calls requiring different skills are handled by a plurality of agents who are individually assigned to different ones of the skills, comprising:

means for automatically determining present values of call center parameters that impact a predetermined performance characteristic of the call center, which characteristic is sought to be optimized, the parameters including a parameter indicating actual assignments of the plurality of call center agents to work handling calls requiring individual ones of the skills;

means for automatically performing an optimization function, using the determined present values, on the predetermined performance characteristic to determine optimum assignments of the plurality of call center agents to skills that optimize the predetermined performance characteristic; and means for automatically adjusting the actual assignments of the plurality of call center agents to skills, to bring the actual assignments closer to the determined optimum assignments.

2. The arrangement of claim 1 wherein:

the predetermined performance characteristic comprises a total benefit to the call center of individual ones of the agents handling calls requiring individual ones of the skills.

3. The arrangement of claim 1 wherein:

the parameter of the actual assignments of the plurality of call center agents to skills includes a parameter ($R_{s,a}$) of proportions of work that individual ones of the agents (a) spend handling calls requiring individual ones of the skills (s).

4. The arrangement of claim 3 wherein:

the predetermined performance characteristic comprises a total benefit (B) to the call center of the individual ones of the agents (a) handling calls requiring the individual ones of the skills (s).

5. The arrangement of claim 4 wherein:

the call center parameters further include for each agent (a) and each skill (s), a benefit ($L_{s,a}$) to the call center of aid each agent (a) handling calls requiring said each skill (s) per unit of time, for each skill (s), a volume ($A_s$) of abandoned calls requiring said each skill (s), and for each skill (s), a penalty ($P_s$) for each abandoned call requiring said each skill (s).

6. The arrangement of claim 5 wherein performing the optimization function comprises maximizing $$B = \sum_s \sum_a L_{s,a} R_{s,a} - \sum_s P_s A_s.$$

7. The arrangement of claim 5 wherein:

the call center parameters further include for each agent (a) and each skill (s), a capacity ($C_{s,a}$) of said each agent (a) to handle calls requiring said each skill (s), and for each skill (s), a volume ($V_s$) of arriving calls requiring said each skill (s); and performing the optimization function comprises maximizing $$B = \sum_s \sum_a L_{s,a} R_{s,a} - \sum_s P_s A_s$$

subject to $\sum_a C_{s,a} R_{s,a} = V_s - A_s.$

8. The arrangement of claim 5 wherein:

the call center parameters further include for each skill (s), a weight ($W_s$) associated with said each skill (s); and performing the optimization function comprises maximizing $$B = \sum_s \sum_a W_s L_{s,a} R_{s,a} - \sum_s P_s A_s.$$

9. The arrangement of claim 4 wherein:
the call center parameters further include
for each agent (a) and each skill (s), a benefit ($B_{s,a}$) to the call center of said each agent (a) handling a call requiring said each skill (s),
for each agent (a) and each skill (s), a capacity ($C_{s,a}$) of said each agent (a) to handle calls requiring said each skill (s),
for each skill (s), a volume ($A_s$) of abandoned calls requiring said each skill (s), and
for each skill (s), a penalty ($P_s$) for each abandoned call requiring said each skill (s).

10. The arrangement of claim 9 wherein:
performing the optimization function comprises maximizing $$B = \sum_s \sum_a B_{s,a} C_{s,a} R_{s,a} - \sum_s P_s A_s.$$

11. The arrangement of claim 4 wherein:
the call center parameters further include
for each agent (a) and each skill (s), a benefit ($B_{s,a}$) to the call center of said each agent (a) handling a call requiring said each skill (s),
for each agent (a) and each skill (s), a volume ($V_{s,a}$) of calls requiring said each skill (s) handled by said each agent (a),
for each skill (s), a volume ($A_s$) of abandoned calls requiring said each skill (s), and
for each skill (s), a penalty ($P_s$) for each abandoned call requiring said each skill (s).

12. The arrangement of claim 11 wherein:
performing the optimization function comprises maximizing $$B = \sum_s \sum_a B_{s,a} V_{s,a} - \sum_s P_s A_s.$$

13. The arrangement of claim 4 wherein:
the call center parameters further include
for each agent (a) and each skill (s), a benefit ($B_{s,a}$) to the call center of said each agent (a) handling a call requiring said each skill (s),
for each agent (s) and each skill (s), a capacity ($C_{s,a}$) of said each agent (a) to handle calls requiring said each skill (s),
for each skill (s), a volume ($A_s$) of abandoned calls requiring said each skill (s), and
for each skill (s), a penalty ($P_s$) for each abandoned call requiring said each skill (s).

14. The arrangement of claim 13 wherein:
performing the optimization function comprises maximizing $$B = \sum_s \sum_a B_{s,a} C_{s,a} R_{s,a} - \sum_s P_s A_s.$$

15. The arrangement of claim 4 wherein:
the call center parameters further include
for each agent (a) and each skill (s), a benefit ($B_{s,a}$) to the call center of said each agent (a) handling a call requiring said each skill (s),
for each skill (s), a volume ($V_s$) of arriving calls requiring said each skill (s),
for each skill (s), a volume ($A_s$) of abandoned calls requiring said each skill (s), and
for each skill (s), a penalty ($P_s$) for each abandoned call requiring said each skill (s).

16. The arrangement of claim 15 wherein:
performing the optimization function comprises maximizing $$B = \sum_s \sum_a B_{s,a}(V_s - A_s) - \sum_s P_s A_s.$$

17. The arrangement of claim 1 wherein:
the parameter of the actual assignments of the plurality of call center agents to skills includes a parameter of actual proportions of work that individual ones of the agents spend handling calls requiring individual ones of the skills;
the optimum assignments of the plurality of call center agents to skills include optimum proportions of work for individual ones of the agents to spend handling calls requiring the individual ones of the skills; and
the adjusting means comprise
means for assigning an individual agent to handle calls requiring an individual skill in response to the optimum proportion of work for the individual agent to spend handling calls requiring the individual skill exceeding the actual proportion of work that the individual agent spent handling calls requiring the individual skill and the individual agent not being assigned to handle calls requiring the individual skill, and for freeing the individual agent from handling calls requiring the individual skill in response to the actual proportion of work that the individual agent spent handling calls requiring the individual skill exceeding the optimum proportion of work for the individual agent to spend handling calls requiring the individual skill and the individual agent being assigned to handle calls requiring the individual skill.

18. A method of automatically assigning call center agents to skills in a call center wherein individual calls requiring different skills are handled by a plurality of agents who are individually assigned to different ones of the skills, comprising the steps of:
automatically determining present values of call center parameters that impact a predetermined performance characteristic of the call center, which characteristic is sought to be optimized, the parameters including a parameter indicating actual assignments of the plurality of call center agents to work handling calls requiring individual ones of the skills;
automatically performing an optimization function, using the determined present values, on the predetermined performance characteristic to determine optimum assignments of the plurality of call center agents to skills that optimize the predetermined performance characteristic; and
automatically adjusting the actual assignments of the plurality of call center agents to skills, to bring the actual assignments closer to the determined optimum assignments.

19. The method of claim 18 wherein:
the predetermined performance characteristic comprises a total benefit to the call center of individual ones of the agents handling calls requiring individual ones of the skills.

20. The method of claim 18 wherein:

the parameter of the actual assignments of the plurality of call center agents to skills includes a parameter of proportions of work that individual ones of the agents spend handling calls requiring individual ones of the skills;

the step of performing comprises the step of
- automatically determining optimum proportions of work for individual ones of the agents to spend handling calls requiring individual ones of the skills; and the step of adjusting comprises the step of
- bringing the actual proportions closer to the optimum proportions.

21. The method of claim 20 wherein:

the step of bringing comprises the steps of
- assigning an individual agent to handle calls requiring an individual skill in response to the optimum proportion for the individual agent exceeding the actual proportion for the individual agent and the individual agent not being assigned to handle calls requiring the individual skill, and
- freeing the individual agent from handling calls requiring the individual skill in response to the actual proportion for the individual agent exceeding the optimum proportion for the individual agent and the individual agent being assigned to handle calls requiring the individual skill.

22. A computer-usable program storage device having embodied therein means for automatically assigning call center agents to skills in a call center, wherein individual calls requiring different skills are handled by a plurality of agents who are individually assigned to different ones of the skills, said means being computer-readable program code means for causing the computer to perform the functions of:

determining present values of call center parameters that impact a predetermined performance characteristic of the call center, which characteristic is sought to be optimized, the parameters including a parameter indicating actual assignments of the plurality of call center agents to work handling calls requiring individual ones of the skills;

performing an optimization function, using the determined present values, on the predetermined performance characteristic to determine optimum assignments of the plurality of call center agents to skills that optimize the predetermined performance characteristic; and adjusting the actual assignments of the plurality of call center is agents to skills, to bring the actual assignments closer to the determined optimum assignments.

23. The device of claim 22 wherein:

the predetermined performance characteristic comprises a total benefit to the call center of individual ones of the agents handling calls requiring individual ones of the skills.

24. The device of claim 22 wherein:

the parameter of the actual assignments of the plurality of call center agents to skills includes a parameter of proportions of work that individual ones of the agents spend handling calls requiring individual ones of the skills;

the step of performing comprises the step of
- determining optimum proportions of work for individual ones of the agents to spend handling calls requiring individual ones of the skills; and the step of adjusting comprises the step of
- bringing the actual proportions closer to the optimum proportions.

25. The device of claim 24 wherein:

the step of bringing comprises the steps of
- assigning an individual agent to handle calls requiring an individual skill, in response to the optimum proportion for the individual agent exceeding the actual proportion for the individual agent and the individual agent not being assigned to handle calls requiring the individual skill; and
- freeing the individual agent from handling calls requiring the individual skill, in response to the actual proportion for the individual agent exceeding the optimum proportion for the individual agent and the individual agent being assigned to handle calls requiring the individual skill.

* * * * *